United States Patent [19]
Toshima et al.

[11] Patent Number: 5,852,514
[45] Date of Patent: Dec. 22, 1998

[54] LIGHT DIFFUSION COMPOSITE

[75] Inventors: Yasumaro Toshima, Yono; Takaaki Kato, Ina-machi, both of Japan

[73] Assignee: Kimoto Co., Ltd., Japan

[21] Appl. No.: 743,364

[22] Filed: Nov. 4, 1996

[30] Foreign Application Priority Data

Nov. 6, 1995 [JP] Japan ................................ 7-313506

[51] Int. Cl.⁶ ................................ G02B 5/02; F21V 7/00; F21S 3/00
[52] U.S. Cl. ........................... 359/599; 362/31; 362/223; 362/268; 362/307; 362/311
[58] Field of Search ................... 359/599; 362/31, 362/223, 268, 307, 311

[56] References Cited

U.S. PATENT DOCUMENTS

| | | | |
|---|---|---|---|
| 3,612,887 | 10/1971 | Canevari et al. | 250/219 Q |
| 4,285,034 | 8/1981 | Sullivan | 362/305 |
| 5,085,932 | 2/1992 | Fujita et al. | 428/331 |
| 5,161,880 | 11/1992 | Azuma | 362/223 |
| 5,619,351 | 4/1997 | Funamoyo et al. | 349/61 |

FOREIGN PATENT DOCUMENTS

| | | | |
|---|---|---|---|
| 5-73601 | 10/1993 | Japan . | |
| 5-73602 | 10/1993 | Japan . | |
| 406059107 | 3/1994 | Japan | 359/599 |
| 6-59107 | 3/1994 | Japan . | |
| 6-59108 | 3/1994 | Japan . | |
| 3010871 | 3/1995 | Japan . | |

Primary Examiner—Cassandra C. Spyrou
Assistant Examiner—Mohammad Y. Sikder
Attorney, Agent, or Firm—Burns, Doane, Swecker & Mathis, L.L.P.

[57] ABSTRACT

A light diffusion composite comprises a light diffusion material disposed on a prism sheet, wherein the light diffusion material is obtained by laminating a light diffusion layer including 100 parts by weight of acrylic resin and 100–220 parts by weight of spherical particles of polymethyl methacrylate on a transparent support. The light diffusion composite has better luminance in the front direction than the conventional light diffusion sheet and also has good light diffusibility.

8 Claims, 3 Drawing Sheets

LIGHT DIFFUSION COMPOSITE

BACKGROUND OF THE INVENTION

1. Field of the Invention

The present invention relates to light diffusion sheets used for luminaires, electric signboards, subsurface projection screens, liquid crystal displays and the like.

2. Prior Art

As a light diffusion sheet for a subsurface illuminator of a liquid crystal display, a light diffusion sheet prepared by applying a transparent resin solution including inorganic particles or resin particles on one side of a transparent plastic film has been used.

The light diffusion sheet is required to hide a light diffusion pattern of a light conducting plate and to produce high luminance in the front direction.

Improvements for better meeting these requirements have been directed to changing the kind or quantity of the light diffusion particles or resins of the light diffusion layer. For example, Japanese Patent Application Laid-open No.5-73602 discloses a light diffusion sheet having beads of urethane resin, polyvinyl chloride resin, acrylic resin or the like dispersed in a two-part curing type resin comprising acrylic resin and isocyanate.

Japanese Patent Application Laid-open No.6-59107 discloses a light diffusion sheet wherein synthetic resin particles and particles having high refractivity are dispersed in transparent resin. Further, Japanese Utility Model Registration No.3010871 proposes a light diffusion sheet having spherical particles of polystyrene mixed in acrylic resin crosslinked by urethane bond.

However, such improvements achieve only limited performance with regard to luminance in the front direction.

Accordingly, an object of the present invention is to solve the above problems and to provide a light diffusion composite which achieves better luminance in the front direction than the conventional light diffusion sheets and also provides a good light diffusibility.

SUMMARY OF THE INVENTION

To achieve the above object, the present invention provides a light diffusion composite comprises a light diffusion material and a prism sheet, wherein the light diffusion material comprises a transparent support and a light diffusion layer formed on the support. The light diffusion layer includes transparent resin and resin particles, preferably spherical particles of polymethyl methacrylate, The amount of the spherical particles included in the light diffusion layer is preferably in the range from 100 to 220 parts by weight based on the 100 parts by weight of the transparent resin.

The transparent resin may be an acrylic resin, preferably an acrylic resin crosslinked by urethane bond.

The light diffusion composite may be in the shape of a sheet, a plate, a film or the like.

DETAILED EXPLANATION OF THE INVENTION

Figure 1:
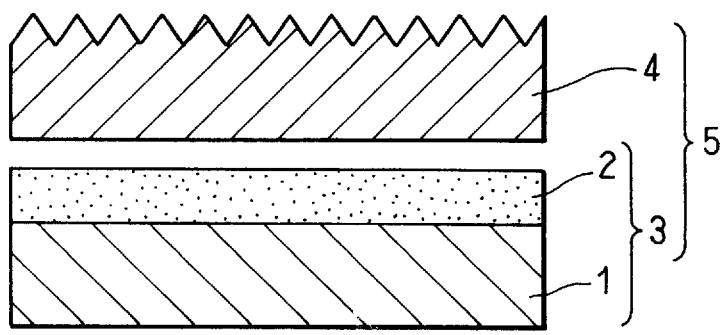
FIG. 1 is a cross-sectional view of a light diffusion composite which is an embodiment of the present invention.

A light diffusion composite of the present invention will be explained in detail hereinafter with reference to FIG. 1.

The light diffusion composite 5 of the present invention is composed of a light diffusion material 3 and a prism sheet 4.

The light diffusion material 3 has a transparent support 1 and a light diffusion layer 2. The transparent support 1 is made of a material having a high transmittance such as a film or a plate of polymethyl methacrylate, polycarbonate, polyvinyl chloride, polyester or acetate resin, a glass plate or the like. From the points of weather resistance, processing characteristics and the like, a polyester film is most preferable.

The light diffusion layer 2 includes an optically transparent resin and resin particles. The optically transparent resin may be acrylic resin, polycarbonate, polyvinyl chloride, polystyrene, polyester, polyurethane or the like. Acrylic resin is preferable for its excellent durability. More preferable is two-part curing type acrylic polyurethane. A resin with a large OH value which elevates the closslinking density is preferable so that a tough coating film can be obtained even if a large amount of pigment is incorporated.

The resin particles are preferably spherical particles of polymethyl methacrylate (PMMA), which is preferably crosslinked by divinylbenzene or the like so as to have good heat resistance, solvent resistance and thermal stability.

The particle size of the spherical particles of PMMA is preferably from 1.0 to 30.0 $\mu$m. When the particle size is less than 1.0 $\mu$m, the luminance of the composite tends to be low. On the other hand, when the particle size is more than 30.0 $\mu$m, the light diffusibility is not sufficient to hide the printed pattern of a light conducting plate.

The transparent resin and the spherical particles are used preferably in the ratio of from 100 to 220 parts by weight of the PMMA spherical particles per 100 parts by weight of the transparent resin. When the amount of the PMMA spherical particles is less than 100 parts by weight, the light diffusion effect is poor since the distribution of the PMMA spherical particles is not dense. On the other hand, when the amount is more than 220 parts by weight, the light harvesting (yielding) ability is poor owing to excessive light diffusibility. Further, the adhesive strength of the coating is low, making it difficult to maintain the durability of the coating.

Preferable methods for preparing the light diffusion material include, for example, the method of dispersing or dissolving the transparent resin and the spherical particles in a proper solvent and applying the solution to the support. As the application method, any conventional method such as spraying, dipping, roll-coating, curtain flow coating, Meyer bar coating or the like can be employed. The thickness of the light diffusion layer is from 1 to 30 $\mu$m. The other side of the support is preferably provided with an anti-Newton coating in order to prevent occurrence of Newton rings due to close contact to the light conducting plate.

Any of various commercially available products can be utilized as the prism sheet 4 of the light diffusion composite of the present invention. A prism sheet with a high transparency and a high light harvesting (yielding) ability is preferable. The "prism sheet" of the present invention includes not only prism sheets with a predetermined apex angle but also prism sheets of various shapes such as round, ellipse or the like. The most preferable prism sheet is an ellipse-shaped prism sheet or a prism sheet with apex angles of from 90 to 100 degree. Examples of such prism sheets include prism sheets sold by Sumitomo 3M Co., Ltd. under the trade names of BEF90HP, BEFII90/50, 100/31 and BEF90, those sold by Mitsubishi Rayon Co., Ltd. under the trade names of DIA ART H150, H210, P150 and P210, that sold by Dai Nippon Printing Co., Ltd. under the trade name of PORTGRAM V7, that sold by Sumitomo Chemical Co., Ltd. under the trade name of LUMTHRU and those sold by Sekisui Chemical Co., Ltd. under the trade names of ESTI-NAWAVE W518 and W425 etc.

FIG. 1 shows an example inwhich the prism sheet 4 rests on the light diffusion material 3 and the diffusion material 3 is placed on the light emitting surface of the light conducting plate (not shown). However, the present invention is not limited to this configuration and the position of the light diffusion material 3 and the prism sheet 4 can be interchanged as required.

The light diffusion composite 5 configured according to the present invention in the foregoing manner can provide a high luminance and a high light diffusibility in a light diffusion composite having a prism sheet, which has been difficult to attain hitherto.

EXAMPLES

The present invention will be further explained by working examples and comparative examples. The expressions "part" and "%" used herein mean "part by weight" and "% by weight" unless otherwise indicated.

Example 1

A light diffusion material was prepared by applying a coating solution having the following composition to one side of a polyester film of a thickness of 100 μm (LUMIRROR T60: Toray Industries Inc.) and drying the solution to form a layer having a thickness of 12 μm.

| Composition of the coating solution (160 parts spherical particles per 100 parts transparent resin) | |
|---|---|
| Acrylic Polyol (Solid content 50%) (AcryDic A-807: DAI NIPPON Ink & Chemicals Inc.) | 10 parts |
| Isocyanate (Solid content 60%) (Takenate D110N: Takeda chemical Industries, Ltd.) | 2 parts |
| Polymethyl methcrylate spherical particles (average particle size: 8 μm) (TEC POLYMER MBX-8: Sekisui Plastics Co., Ltd.) | 10 parts |
| Methylethyl ketone | 18 parts |
| Butyl acetate | 18 parts |

A light diffusion composite was obtained by placing the above light diffusion material on a prism sheet (BEF90HP: Sumitomo 3M Co., Ltd.) so that the light diffusion layer of the light diffusion material faced to the side of the prism sheet opposite its prism surface.

Example 2

A light diffusion composite was prepared in the same manner as in the Example 1, except that the coating solution for the light diffusion layer contained 7 parts of the spherical particles. The light diffusion layer contained 113 parts of the spherical particles per 100 parts of the transparent resin.

Example 3

A light diffusion composite was prepared in the same manner as in the Example 1, except that the coating solution for the light diffusion layer contained 13 parts of the spherical particles. The light diffusion layer contained 210 parts of the spherical particles per 100 parts of the transparent resin.

Example 4

A light diffusion composite was prepared in the same manner as in the Example 1, except that a different prism sheet (DIA ART H150: Mitsubishi Rayon Co., Ltd.) was used instead of the prism sheet of the Example 1.

Comparative Example 1

A prism sheet (BEF90HP: Sumitomo 3M Co., Ltd.) was used as a light diffusion sheet without a light diffusion material.

Comparative Example 2

A high luminance type light diffusion sheet (LIGHT UP 100SH:

Kimoto Co. Ltd.) was used as a light diffusion sheet without a prism sheet. This light diffusion sheet has a light diffusion layer formed on a transparent support. The light diffusion layer comprises synthetic resin particles and particles having high refractivity are dispersed in transparent resin.

Comparative Example 3

A light diffusion composite was prepared in the same manner as in the Example 1, except that a high luminance type light diffusion sheet (LIGHT UP 100SH: Kimoto Co. Ltd.) was used instead of the light diffusion material of the Example 1.

Comparative Example 4

A light diffusion composite was prepared in the same manner as in the Example 1, except that the coating solution for the light diffusion layer contained 5 parts of the spherical particles. The light diffusion layer contained 81 parts of the spherical particles per 100 parts of the transparent resin.

Comparative Example 5

A light diffusion composite was prepared in the same manner as in the Example 1, except that the coating solution for the light diffusion layer contained 14 parts of the spherical particles. The light diffusion layer contained 226 parts of the spherical particles per 100 parts of the transparent resin.

Figure 2:
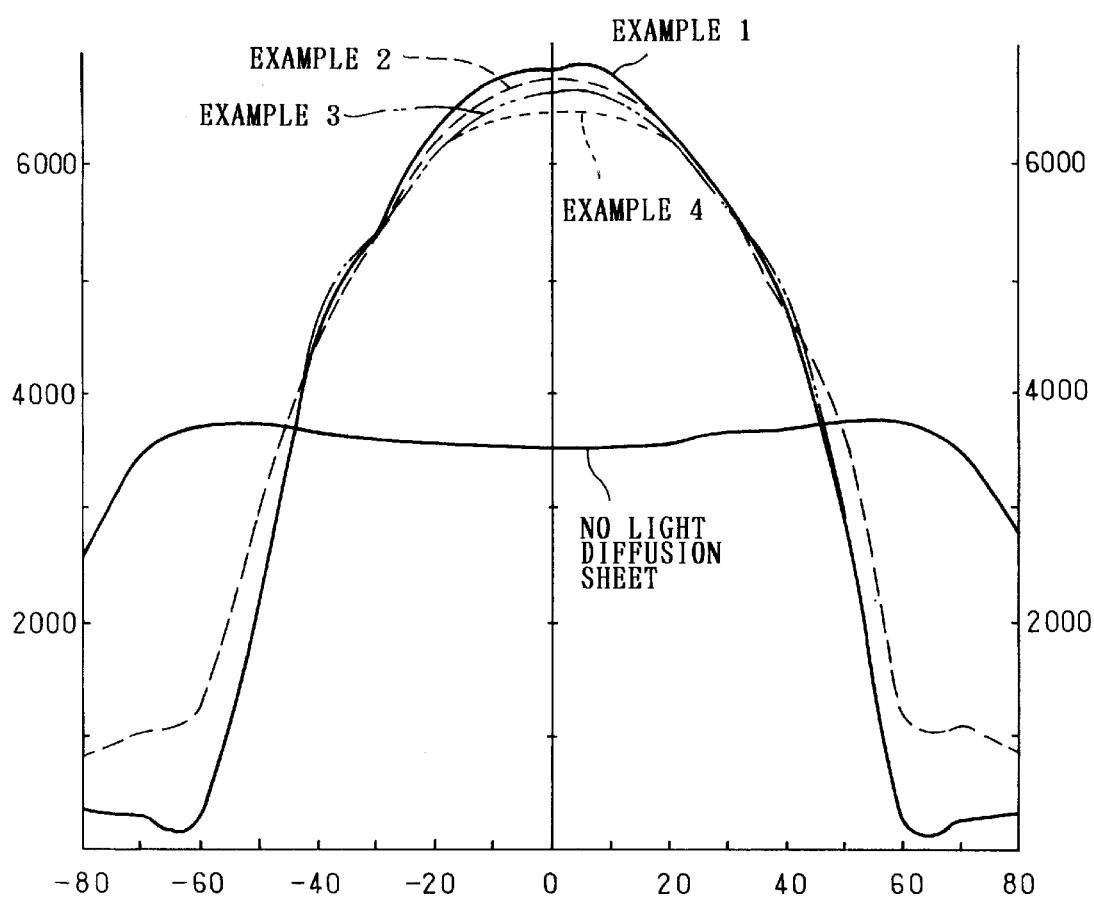
FIG. 2 is a graph showing the luminance of the light emitting surfaces of light diffusion composites of Examples according to the present invention measured at various angles.
Figure 3:
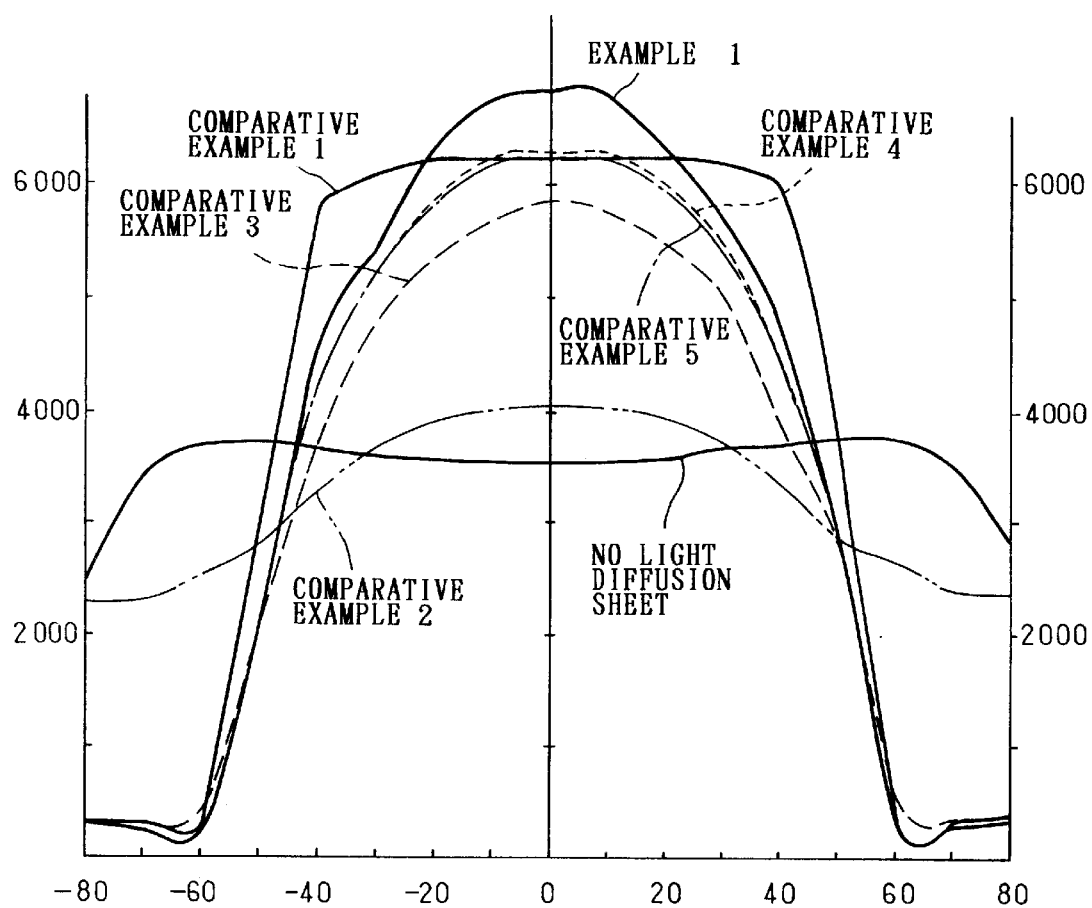
FIG. 3 is a graph showing the luminance of the light emitting surfaces of the light diffusion composites of Comparative Examples measured at various angles.

The light diffusion composites of Examples 1–4 and Comparative Examples 1–5 were respectively incorporated in a backlight unit for 5.5-inch liquid crystal display. The units were provided with double lamps and a light conducting plate with a thickness of 5 mm. Luminance in the horizontal direction was measured at every 10° from 80° to −80° where the front direction of the unit was defined as 0°. The results are shown in Table 1. The results when luminance was measured without a light diffusion composite (sheet) are also shown in Table 1. FIGS. 2 and 3 were prepared in order to evaluate these results visually. In these figures, the vertical axis represents luminance (cd/m$^2$) and the horizontal axis represents angle from the front direction.

The light diffusibility was evaluated visually and the result thereof is also shown in Table 1. Here, "X" indicates that the light diffusion pattern of the light conducting plate was visible and "◯" indicates that the pattern was not visible.

TABLE 1

| | | LUMINANCE(cd/m²) | | | | | | | | |
|---|---|---|---|---|---|---|---|---|---|---|
| | DIFFUSION | 0 | −10 / +10 | −20 / +20 | −30 / +30 | −40 / +40 | −50 / +50 | −60 / +60 | −70 / +70 | −80 / +80 |
| NO DIFFUSION SHEET | — | 3520 | 3530 | 3560 | 3610 | 3670 | 3720 | 3700 | 3450 | 2530 |
| | | | 3520 | 3570 | 3620 | 3670 | 3730 | 3700 | 3480 | 2730 |
| EXAMPLE 1 | ○ | 6840 | 6750 | 6330 | 5440 | 4570 | 2160 | 301 | 284 | 325 |
| | | | 6780 | 6430 | 5630 | 4660 | 2740 | 294 | 262 | 303 |
| EXAMPLE 2 | ○ | 6730 | 6620 | 6210 | 5420 | 4650 | 2210 | 299 | 281 | 321 |
| | | | 6660 | 6300 | 5580 | 4740 | 2840 | 295 | 262 | 300 |
| EXAMPLE 3 | ○ | 6620 | 6490 | 6080 | 5400 | 4720 | 2250 | 296 | 278 | 318 |
| | | | 6530 | 6170 | 5540 | 4820 | 2940 | 295 | 261 | 297 |
| EXAMPLE 4 | ○ | 6470 | 6400 | 6090 | 5390 | 4530 | 3050 | 1310 | 1040 | 836 |
| | | | 6430 | 6190 | 5570 | 4680 | 3610 | 1270 | 1110 | 841 |
| COMPARATIVE EXAMPLE 1 | X | 6210 | 6210 | 6190 | 6090 | 5830 | 2370 | 362 | 334 | 377 |
| | | | 6210 | 6210 | 6140 | 5920 | 3600 | 360 | 303 | 321 |
| COMPARATIVE EXAMPLE 2 | ○ | 4050 | 4000 | 3910 | 3680 | 3320 | 2860 | 2590 | 2360 | 2330 |
| | | | 4010 | 3930 | 3690 | 3330 | 2850 | 2610 | 2380 | 2340 |
| COMPARATIVE EXAMPLE 3 | ○ | 5860 | 5680 | 5360 | 4820 | 3770 | 2180 | 500 | 364 | 318 |
| | | | 5710 | 5440 | 4990 | 3840 | 2770 | 490 | 338 | 297 |
| COMPARATIVE EXAMPLE 4 | X | 6290 | 6240 | 5880 | 5280 | 4310 | 2200 | 300 | 280 | 320 |
| | | | 6270 | 5970 | 5460 | 4390 | 2820 | 294 | 260 | 301 |
| COMPARATIVE EXAMPLE 5 | ○ | 6230 | 6180 | 5820 | 5230 | 4270 | 2200 | 298 | 280 | 320 |
| | | | 6210 | 5910 | 5410 | 4350 | 2800 | 292 | 260 | 299 |

As can be seen from the results shown in Table 1, FIGS. 2 and 3, luminance in the front direction was very high and the light diffusibility was good when any of the light diffusion composites of Examples 1 to 4 was used.

When the prism sheet of Comparative Example 1 was used, luminance in the front direction was relatively high owing to the use of a prism sheet, but the pattern of the light conducting plate could be clearly observed since the prism sheet did not have light diffusibility.

The backlight unit of Comparative Example 2, where the high-luminance type light diffusion sheet conventionally used without a prism sheet was employed, showed very inferior luminance, as shown in FIG. 3, as compared with that of Example 1.

In the backlight unit of Comparative Example 3, where the conventional high-luminance type light diffusion sheet was used in combination with a prism sheet, luminance in the front direction was improved as compared with use of the high-luminance type light diffusion sheet alone but was less than that of Example 1.

The backlight unit of Comparative Example 4, which had a similar construction to that of Example 1, showed somewhat less luminance in the front direction than that of the Example 1because the amount of spherical particles was 81 parts per 100 parts of transparent resin. It further showed weak light diffusibility so that the pattern of the light conducting plate could be seen.

The backlight unit of Comparative Example 5, which had a similar construction to that of Example 1, showed somewhat less luminance in the front direction than that of Example 1 because the amount of the spherical particles was 226 parts per 100 parts of transparent resin. Further, the strength of the light diffusion layer was low because of the large amount of the spherical particles and the surface of the light diffusion layer tended to scratch easily.

According to the light diffusion composite of the present invention, high luminance and high light diffusibility in a light diffusion composite with a prism sheet can be obtained, which has been considered to be difficult to attain hitherto.

We claim:

1. A light diffusion composite comprising a light diffusion material and a prism sheet, wherein the light diffusion material comprises a transparent support and a light diffusion layer formed on the transparent support, and wherein the light diffusion layer comprises transparent resin and spherical particles of polymethyl methacrylate.

2. The light diffusion composite of claim 1, wherein an amount of the particles included in the light diffusion layer is in the range from 100 to 220 parts by weight based on 100 parts by weight of the transparent resin.

3. The light diffusion composite of claim 1, wherein the transparent resin is acrylic resin.

4. The light diffusion composite of claim 1, wherein an amount of the spherical particles included in the light diffusion layer is in the range from 100 to 220 parts by weight based on 100 parts by weight of the transparent resin.

5. The light diffusion composite of claim 1, wherein the transparent resin is acrylic resin.

6. The light diffusion composite of claim 5, wherein the acrylic resin is acrylic resin crosslinked by urethane bond.

7. A light diffusion composite which comprises a light diffusion material and a prism sheet, wherein the light diffusion material comprises a transparent support and a light diffusion layer formed on the transparent support, and wherein the light diffusion layer comprises resin particles and acrylic resin crosslinked by urethane bond.

8. The light diffusion composite of claim 7, wherein an amount of the resin particles included in the light diffusion layer is in the range from 100 to 220 parts by weight based on 100 parts by weight of the acrylic resin.

* * * * *